United States Patent [19]

Masuda

[11] Patent Number: 5,157,964
[45] Date of Patent: Oct. 27, 1992

[54] METHOD AND APPARATUS FOR JUDGING CRUSHES OF CAN BODY

[75] Inventor: Masayuki Masuda, Sagamihara, Japan

[73] Assignee: Daiwa Can Company, Tokyo, Japan

[21] Appl. No.: 562,199

[22] Filed: Aug. 2, 1990

[51] Int. Cl.$^5$ .............................................. G01B 7/34
[52] U.S. Cl. ...................................... 73/104; 73/821; 100/99
[58] Field of Search ............... 73/821, 104, 865.8, 73/865.9; 100/99, 902, 54, 55, 56, 57, 58, 59, 60, 61, 62, 63, 64; 340/665, 679

[56] References Cited

U.S. PATENT DOCUMENTS

| | | | |
|---|---|---|---|
| Re. 30,298 | 6/1980 | Keller | 100/99 X |
| 1,063,191 | 6/1913 | Gallagher | 100/99 X |
| 2,041,869 | 5/1936 | Smith et al. | 73/821 |
| 2,226,527 | 12/1940 | Walter | 100/99 X |
| 2,325,027 | 7/1943 | Anway | 100/99 X |
| 3,580,167 | 5/1971 | Simshauser | 100/902 X |
| 4,091,725 | 5/1978 | Arp | 100/99 X |
| 4,425,797 | 1/1984 | Morrison | 73/821 X |

FOREIGN PATENT DOCUMENTS

| | | | |
|---|---|---|---|
| 2902360 | 7/1980 | Fed. Rep. of Germany | 100/99 |
| 156898 | 9/1982 | Japan | 100/99 |
| 211548 | 9/1987 | Japan . | |
| 228151 | 10/1987 | Japan . | |
| 239043 | 10/1987 | Japan . | |
| 247205 | 10/1987 | Japan . | |
| 53401 | 3/1988 | Japan . | |
| 53450 | 3/1988 | Japan . | |
| 53451 | 3/1988 | Japan . | |

OTHER PUBLICATIONS

Patent Abstracts of Japan; Grp. P736, vol. 12, No. 271, Abs. Pub. Date Jul. 28, 1988 (63-53451).
Patent Abstracts of Japan; Grp. P376, vol. 12, No. 271, Abs. Pub. Date Jul. 28, 1988 (63-53450 and 63-53401); Grp. P690, vol. 12, No. 123, Abs. Pub. date Apr. 16, 1988 (62-247205); Grp. P686, vol. 12, No. 107, Abs. Pub. date Apr. 7, 1988 (62-239043); Grp. P681, vol. 12, No. 95, Abs. Pub. date Mar. 29, 1988 (62-228151); Grp. P673, vol. 12, No. 71, Abs. Pub. date Mar. 5, 1988 (62-211548).

Primary Examiner—Tom Noland
Attorney, Agent, or Firm—Morrison Law Firm

[57] ABSTRACT

A double seamer; included a chuck and a lifter plate vertically aligned with each other. Seaming rolls are set near the chuck. When a can body wall with a lid is clamped between said chuck and lifter plate, the spring pressure of a resilient member supporting the lifter plate is measured and if the measured value is less than a predetermined value, the can body wall is judged to have been crushed. The seamer is included with a ring cam plate having a high spot and a low spot. The high spot is provided with a load bearing member and a load cell installed underneath the load bearing member such that the spring pressure is measured when a cam roll set at the lower end of a lifter plate support member is in contact with the load bearing member.

1 Claim, 5 Drawing Sheets

METHOD AND APPARATUS FOR JUDGING CRUSHES OF CAN BODY

BACKGROUND OF THE INVENTION

This invention relates to a method and an apparatus for judging occurrence of crushes on a body wall of a can being run through a double seamer.

Conventionally, there are known methods of judging occurrence of crushes on a body wall of a can. Japanese patent laid-open publication Nos. 211548/87, 228151/87, 239043/87 and 53450/88 have disclosed optical methods, and Japanese patent laid-open publication Nos. 247205/87, 53401/88 and 53451/88 have disclosed methods of using proximity sensors to detect changes of magnetic fields, in judging occurrence of crushes on a body wall of a can.

Among these publications, the first-mentioned publication discloses a technique, in which a plurality of sets of laser beam emitter/receiver are provided in a row extending along and in the height direction of a can and surface irregularities of the body wall of the can are detected in terms of amounts of random reflection of laser beams. The second-mentioned publication discloses a technique, in which a plurality of sets of laser beam emitter/receiver are provided in a row extending along and in the height direction of the can and surface irregularities of the body wall of the can are detected in terms of changes of distance between each two portions diametrically opposite each other within the body wall. The third and fourth-mentioned publications disclose a common technique in sofar as surface irregularities of a body wall of a can are detected by means of a plurality of sets of light emitter/receiver provided in a row extending along and in the height direction of the can. However, the method as disclosed in the third-mentioned publication relies on changes of distance between each two portions diametrically opposite each other within the body wall while the disclosure in the forth-mentioned publication relies on the difference in the amount of light received by respective adjacent receivers. The fifth-mentioned publication discloses a technique, in which a plurality of proximity sensors are provided in a row extending along and in the height direction of a can and surface irregularities of the body wall of the can are detected in terms of electrical signals. The sixth-mentioned publication discloses a technique, in which a plurality of elongated eddy current displacement sensors are provided in a row extending along and in the height direction of a can and surface irregularities of the body wall of the can are detected in terms of amounts of displacement. The seventh-mentioned publication discloses a technique, in which a plurality of proximity sensors are provided in a row extending along and in the height direction of a can and surface irregularities of the body wall of the can are detected from the difference of electrical signals generated by adjacent sensors.

For effectively judging occurrence of crushes on a body wall of a can according to those known methods, large numbers of sets of light emitter/receiver or proximity sensors have to be provided so as to cover, in both diameter length and height direction, substantially whole portions of the body wall of the can which is liable of crushing. Thus, an apparatus employing any one of such known methods essentially becomes a complicated one.

The inventor conducted extensive research and studies in an attempt to overcome such disadvantages of the known methods and has confirmed through experiments that, in a case that an end closure is double-seamed on each of can bodies being the same in height, if a body wall of a can is crushed, the can is subjected to lower clamping force, i.e. lower pressure of a spring supporting a lifter plate, when it is being held between a chuck and the lifter plate of a double seamer.

As is well known in the art a seamer is provided with a chuck and a lifter plate aligned vertically with each other and seaming roll set near the chuck, assembling of a lid on a body wall of a can is effected by a double seaming process in which seaming rolls are forced against the flange of the lid while the body wall and the lid are being clamped between said chuck and lifter plate by means of a compression spring which supports the lifter plate. It is also well known that in order to obtain a normal double seam, the body wall has to be held against the lid with a predetermined amount of force during the double seaming process. This predetermined force is given by the aforesaid spring. A can being free from crushes on the body wall is seamed under predetermined force. If the body wall is crushed, however, the can height is reduced or the body hook of the body wall becomes shorter, so that the spring supporting the lifter plate to hold the body wall against the lid is subjected to a smaller amount of compression, resulting in smaller amount of spring force of the lifter plate to hold the body wall against the lid. For example, where the predetermined force is 100 kgf, the spring force of the lifter plate becomes 40 to 80 kgf or 40 to 80% of the predetermined force if the body wall is crushed.

SUMMARY OF THE INVENTION

The present invention is intended to provide a method and an apparatus for conveniently and adequately judging occurrence of crushes on a body wall of a can based on the aforementioned findings. According to the invention, there is provided a method of judging occurrence of crushes on a body wall of a can in a double seaming process to assemble the body wall and a lid by a double seamer provided with a chuck and a lifter plate aligned vertically with each other and seaming roll near the chuck, while the body wall and the lid are being clamped between said chuck and lifter plate by the spring pressure of a resilient member supporting the lifter plate, wherein the spring pressure is measured for each can being assembled so that the occurrence of crushes is identified when the measurement obtained is smaller than a predetermined value.

According to the invention, there is also provided an apparatus for judging the occurrence of crushes on a body wall of a can being assembled with a lid by means of a double seamer provided with a ring cam plate having a high spot and a low spot, a lifter plate support member containing a resilient member and carrying at its bottom end a cam roll which moves in contact with the cam plate, a lifter plate which is resiliently supported by said lifter plate support member, a chuck which is mounted in alignment with said lifter plate and moves in timed relation with said lifter plate support member, and a seaming roll which moves away from and close to the chuck, wherein the high spot of the cam plate is provided with a load bearing member and a load cell installed underneath the load bearing member such that the spring force of the resilient member is measured when the cam roll is in contact with the load bearing member.

The apparatus according to the invention has a simple construction, comprising the load-bearing member and the load cell installed at the high spot of the cam plate for measuring the spring pressure of the resilient member, and is still capable of measuring by a single set of the load cell, and comparing with a predetermined force, an amount of the spring pressure with respect to all cans on a series of lifter plates of a high-speed continuous double seamer.

DETAILED DESCRIPTION OF THE PREFERRED EMBODIMENTS

An embodiment of the apparatus according to the invention will be described with reference to the drawings.

Figure 1:
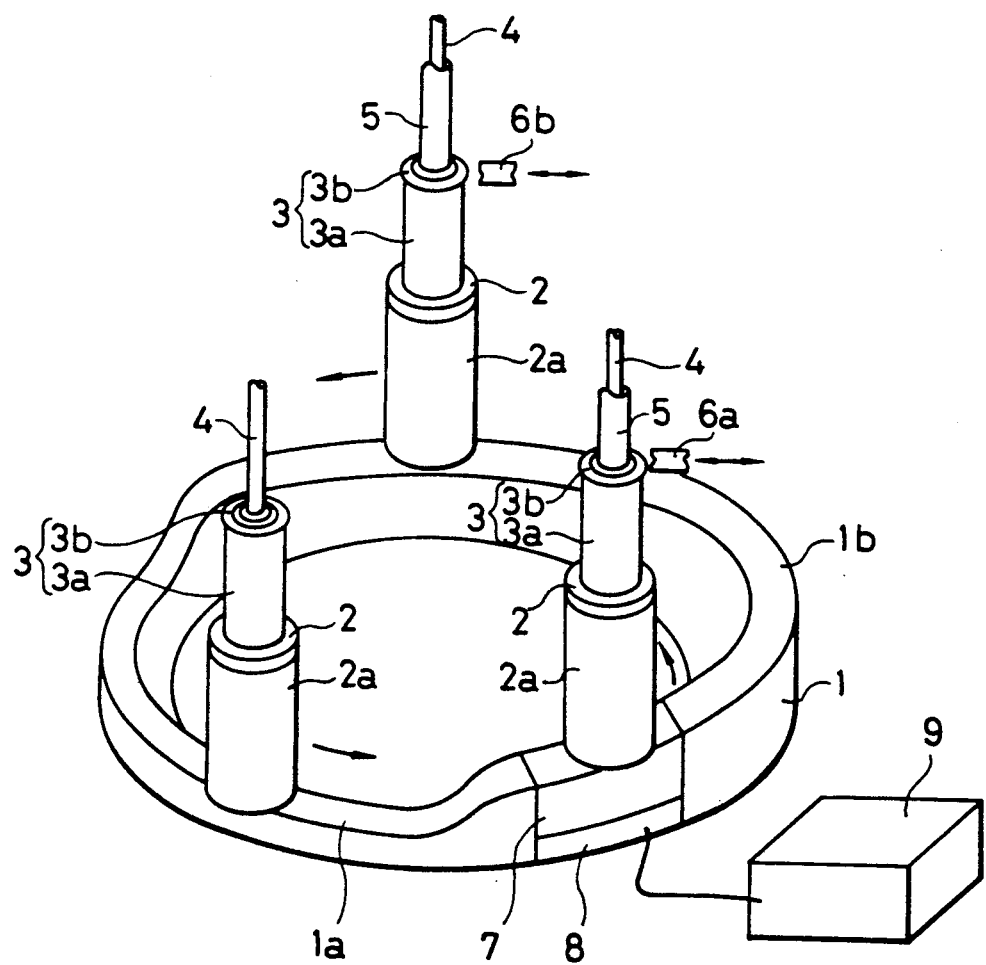
FIG. 1 illustrates the relative disposition of a ring cam plate, lifter plate support members, chucks, a load bearing member and a load cell on a double seamer.

Referring to FIG. 1, member 1 is a ring cam plate fixedly mounted to the frame of a double seamer (not shown), having a low spot 1a and a high spot 1b. Member 2 is a lifter plate, 2a is a lifter plate support member moving on the cam surface and supporting the lifter plate (this support member being well known as will be described later with reference to FIG. 2), 3 is a can with a body wall 3a and a lid 3b, 4 is a holding member to hold the lid over the body wall, 5 is a chuck being fitted to the lid over the body wall held on the lifter plate 2 and moving in timed relation with the lifter plate support member 2a, 6a is a first seaming roll, 6b is a second seaming roll, 7 is a load bearing member inserted in the high spot 1b of the cam plate 1, 8 is a load cell provided under the load bearing member 7, and 9 is a comparator/judging unit connected to the load cell 8.

The construction of load bearing member 7, load cell 8 and comparator/judging unit 9 will now be described in further detail.

Figure 3:
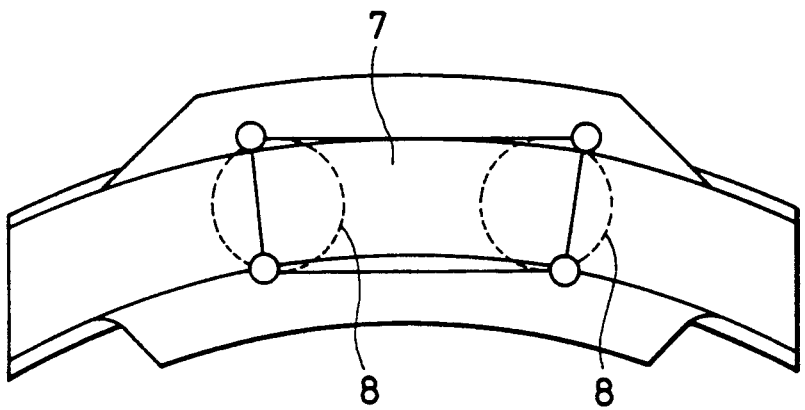
FIG. 3 is a plan view of the load-bearing member.
Figure 4:
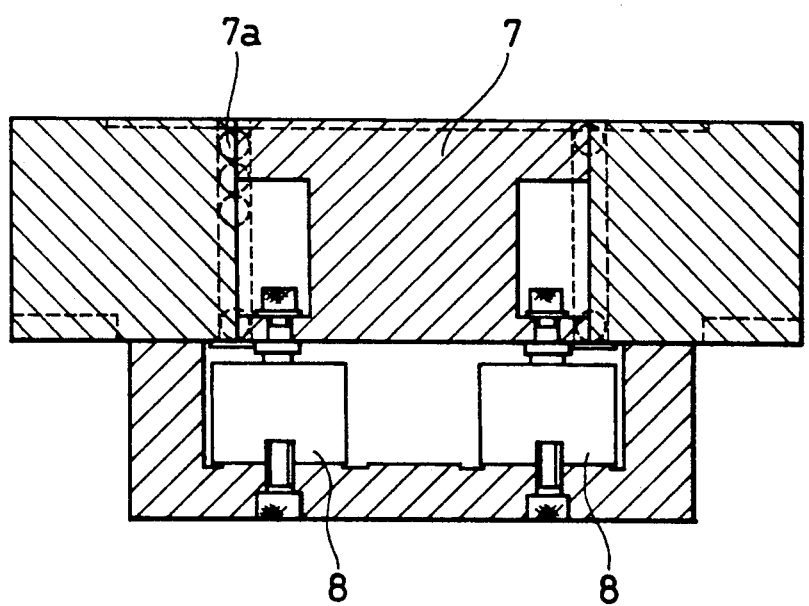
FIG. 4 is a sectional view showing the setting of the loadbearing member and the load cell.

Referring to FIGS. 3 and 4, the load bearing member 7 has ball bearings 7a which transmit the lifter load at the time of double seaming through a cam roll 15 to the load cell 8. One or two load cells 8 may preferably be used depending on the length of member 7 in the direction of travel of the cam roll 15. Load cell 8 converts the lifter load at the time of double seaming into electric signals.

Figure 5A:
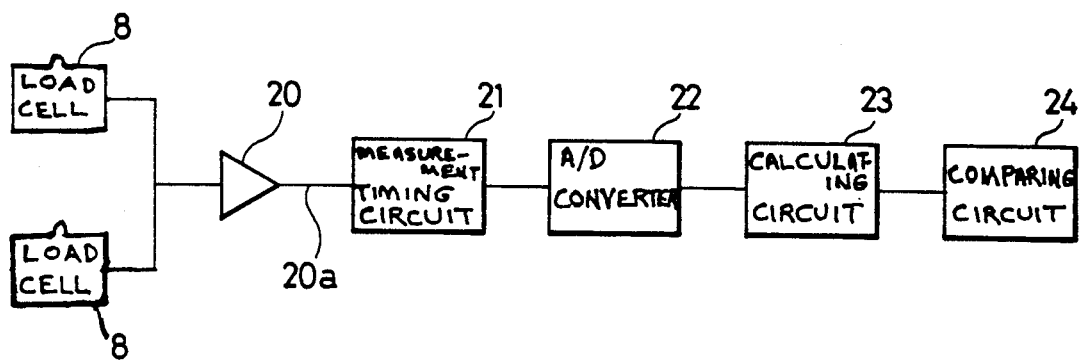
FIG. 5a is a block diagram of a comparator/judging unit.
Figure 5B:
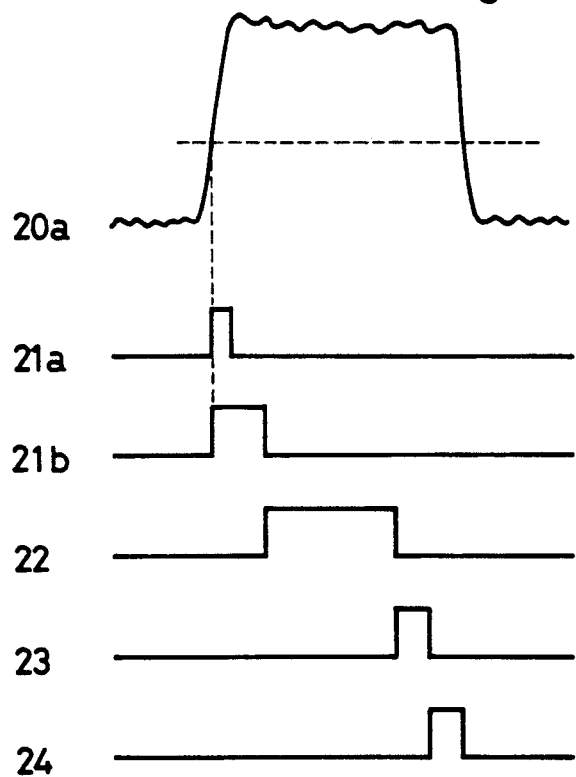
FIG. 5b is a timing chart associated with functioning of the unit depicted in FIG. 5a, and FIG. 6 is a front view of an example of a can crushed at several portions of the body wall.
Figure 6:
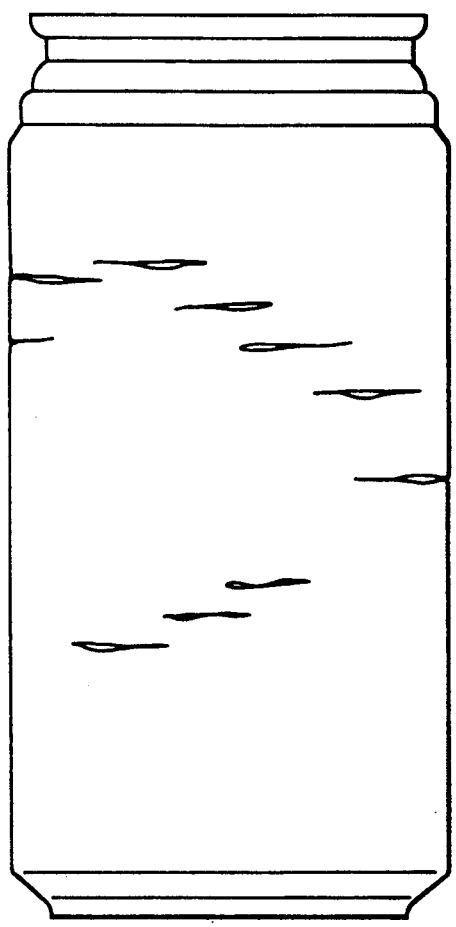

Comparator/judging unit 9 will now be described with reference to FIG. 5. Amplifier 20 amplifies an average output per can of the load cells 8 to 2 v/200 kgf. An output signal at this time is shown as 20a. Measurement timing circuit 21 provides a trigger pulse 21a when signal 20a reaches a predetermined output level. Delay signal 21b delays start of A/D converter 22 depending on the speed of the double seamer until signal 20a reaches a high and becomes stable. A/D converter 22 effects A/D conversion of signal 20a at a sampling interval of one per millisecond. Circuit 23 calculates average values of eight and sixteen outputs from the A/D converter circuit. Circuit 24 compares the average values obtained by the circuit 23 with a preset value, and gives a reject signal if the average values are smaller than the preset value.

Figure 2:
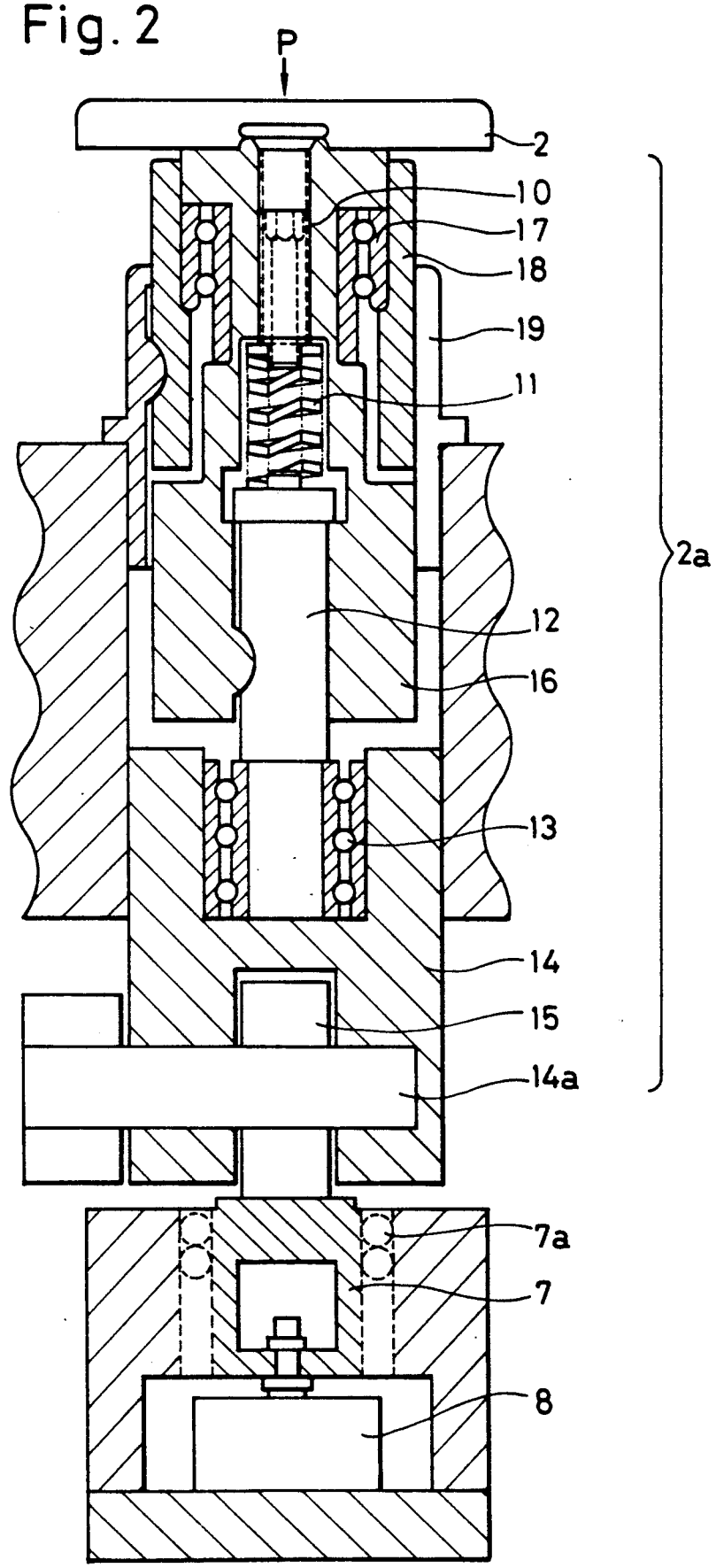
FIG. 2 is a sectional view showing the lifter plate, the lifter plate support member, the load-bearing member and the load cell.

FIG. 2 is a schematic sectional view showing known lifter plate 2 and lifter plate support member 2a as well as the load bearing member 7 and the load cell 8 in this embodiment. Referring to this Figure, 10 is a spring pressure adjusting member attached to the bottom center surface of the lifter plate 2, 11 is a coil spring, 12 is a lower holding member supporting the spring, 13 is a lower ball bearing supporting the lower end of the lower holding member 12, 14 is a second lower member having an upper end supporting the lower ball bearing 13 and a lower end carrying the cam roll 15 rotatably mounted on a pin 14a inserted therein. 16 is an upper member accommodating the spring pressure adjusting member 10, spring 11 and substantial portion of lower member 12 and secured to the lifter plate 2, 17 is an upper ball bearing fitted onto the upper member 16, 18 is a cylindrical holder holding the external wall of the upper ball bearing 17 and 19 is a cylindrical movable member freely movable in a vertical direction with respect to the cylindrical holder 18, all of which comprise the lifter plate support member 2a.

Following are brief descriptions of the procedure employed for measuring the spring pressure and assembling a can.

Referring to FIG. 1, while the lifter plate support member 2a is on the low spot 1a of cam plate 1, the lid 3b is placed on the body wall 3a and held down by the holding member 4. The lifter plate support member 2a advances along the cam plate and climbs to the high spot 1b of cam plate 1. As the lifter plate support member goes up, the lid comes in contact with and fits onto the chuck 5 located at a predetermined elevation. At this point in time, the coil spring 11 is compressed to a predetermined size, so that the body wall and the lid are clamped between the chuck and the lifter plate by the spring pressure of spring 11. The spring pressure is adjustable by operating the spring pressure adjusting member 10.

Subsequently, the first seaming roll 6a gradually moves in while revolving around the lid 3b so that the first seaming operation takes place to preliminarily assemble the body wall and the lid. Then, the second seaming roll 6b performs the second seaming operation as it moves in while revolving around the lid, so that a complete double seam is formed. Thereafter, the lifter plate support member 2a goes down towards the low spot 1a of the cam plate. As the lifter plate support member goes down, the lid is released from the chuck and completely assembled can 3 is discharged by a suitable means.

The apparatus in this embodiment of the invention has the loadbearing member 7 which is provided at the high spot 1b of cam plate member 1 such that its top surface is flush with the top surface of the high spot 1b. Thus, as the lower lifter support member proceeds along the high spot 1b of the cam plate, the load-bearing member 7 is subjected to the pressure of the cam roll of the lifter plate support member.

Thus, the force for clamping the body wall and the lid, or the spring pressure is transmitted through the load bearing member and measured by the load cell 8. The measurement obtained is relayed to the comparator/judging unit 9 and compared with a predetermined value. If the measurement is equal or greater than the predetermined value, the body wall is judged to be free from crushes. On the contrary, if the measurement is smaller than the predetermined value, the body wall is judged to have been crushed.

Using the double seamer equipped with the apparatus of this embodiment of the invention, 10,000 tin-plate DI can bodies of 66 mm in diameter and 122 mm in height were assembled with lids. All can bodies which were judged by the said apparatus to have crushed body walls were found to actually have crushed body walls and no crushed body wall was found in the can bodies which were judged to be free from crushing.

As aforementioned, the method according to the invention offers great advantages in that cans with crushed body walls are sorted out without fail during the double seaming operations.

Further, the apparatus according to the invention is simple in construction and still performs reliably in judgment of occurence of crushes on body walls of all cans being run on a continuous double seamer.

We have so far described the preferred embodiment of this invention, but it should be understood that the scope of this invention is by no means limited to the foregoing description. It is also to be understood that many variations and modifications can be made without departing from the scope and spirit of the invention.

What is claimed is:

1. An apparatus for judging occurrence of crushes on a body wall of a can being assembled with a lid by means of a double seamer provided with a ring cam plate having a high spot and a low spot, a lifter plate support member containing a resilient member and carrying at a bottom end thereof a cam roll which moves in contact with the cam plate, a lifter plate which is resiliently supported by said lifter plate support member, a chuck which is mounted in alignment with said lifter plate and moves in timed relation with said lifter plate support member, and seaming rolls which move away from and close to the chuck; characterized in that a load bearing member is provided at a high spot of the cam plate and a load cell is installed underneath said load bearing member to measure spring pressure of the resilient member when the cam roll is in contact with said load bearing member.

* * * * *